(12) United States Patent
Yamaguchi (10) Patent No.: US 6,897,487 B2
(45) Date of Patent: May 24, 2005

(54) OPTICAL COUPLING DEVICE (75) Inventor: Hiroshi Yamaguchi, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 247 days.

(21) Appl. No.: 10/270,329

(22) Filed: Oct. 15, 2002

(65) Prior Publication Data

US 2003/0072544 A1 Apr. 17, 2003

(30) Foreign Application Priority Data

Oct. 15, 2001 (JP) .................................... 2001-317090

(51) Int. Cl.[7] ............................................. H01L 17/15
(52) U.S. Cl. ...................................... 257/82; 257/113
(58) Field of Search ...................... 257/82, 113, 114, 257/116, 432, 459; 385/14, 32

(56) References Cited

U.S. PATENT DOCUMENTS 5,647,034 A * 7/1997 Matsuda et al. ............ 385/16
6,019,523 A * 2/2000 Honmou ...................... 385/94
6,025,610 A * 2/2000 Kusaka et al. ............... 257/82
6,655,856 B2 * 12/2003 Nakanishi et al. ........... 385/94
6,754,407 B2 * 6/2004 Chakravorty et al. ........ 385/14

FOREIGN PATENT DOCUMENTS

JP  2-143548 A   6/1990
JP  3-214653     9/1991

* cited by examiner

Primary Examiner—Howard Weiss
Assistant Examiner—(Vikki) Hoa B. Trinh
(74) Attorney, Agent, or Firm—Birch, Stewart, Kolasch & Birch, LLP.

(57) ABSTRACT

An optical coupling device includes: a light emitter provided on an input lead frame; a photoreceptor provided on an output lead frame; a load driving semiconductor element provided on a front surface of the output lead frame, and connected to the photoreceptor via the output lead frame; and a sealing resin section as a package for protecting the light emitter, the photoreceptor and the load driving semiconductor element, wherein a thermoelectric conversion element is provided in the package.

21 Claims, 5 Drawing Sheets

OPTICAL COUPLING DEVICE

BACKGROUND OF THE INVENTION

Field of the Invention

The present invention relates to an optical coupling device, which is made of a unified light emitter and photoreceptor by being optically coupled, and in particular to an optical coupling device further including a load driving semiconductor element in the same package, such as a solid state relay.

DESCRIPTION OF THE RELATED ART

An example of a conventional optical coupling device may be a solid state relay, which includes a light emitter, a photoreceptor, and a load driving semiconductor element, which are sealed with resin and included in a single package. A solid state relay using a triac as the load driving semiconductor element (hereinafter also referred to as a triac output solid state relay) can be described as an example of the solid state relay.

Figure 10:
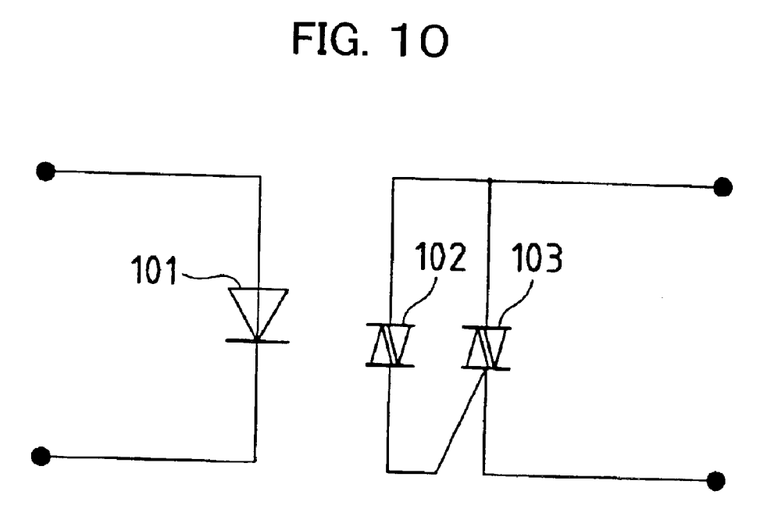
FIG. 10 is an explanatory view showing a conventional solid state relay.

As shown in FIG. 10, the triac output solid state relay includes a light emitter for converting an electronic signal into light (generally, gallium arsenide LED (light emitting diode) or gallium aluminum arsenide LED) 101, a photoreceptor for converting light into an electric signal (a photo triac in the figure) 102 and a load driving triac 103 which is connected to the photo receptor. However, this triac output solid state relay has an inadequacy such that power consumed for its own operation generates heat, and the raised temperature decreases performance of the element.

Further, the generated heat of the load driving semiconductor element also gives thermal stress to the light emitter and the photoreceptor, which affects aged degradation of the elements.

In order to clear away these inadequacies, the triac output solid state relay above requires some ideas for its thermal design. An example of the ideas to effectively radiate the heat generated from the load driving semiconductor element in a short period of time may be a different arrangement of the element with, for example, a bigger package, or may be some additional devices such as a heat sink, air cooling fan or the like.

However, the ideas used for the thermal design of a conventional optical coupling device is nearly pushed to the limit, and it greatly interferes downsizing of the all devices using such an optical coupling device.

Further, if a trouble occurs in the optical coupling device or in its peripheral circuits, then a current of more than the rated current for the device suddenly flows and the heat higher than its thermal design is generated, it may cause even the destruction of the optical coupling device. Thus, to further ensure the safety of the device, a function of turning off the device is preferably required in the optical coupling device so as to cope with an irregular operation such as overheat.

Further, the heat generation causes extra consumption of electric energy in the optical coupling device, and requires greater energy than the necessary energy for driving the optical coupling device. In consideration of the current circumstance requiring further energy saving in various fields, the waste of energy due to the heat generation have to be effectively used.

SUMMARY OF THE INVENTION

An object of the present invention is to provide an optical coupling device which can realize compulsive cooling, temperature detection, and effective use of energy in its package, and has a simpler arrangement for the conventionally-used thermal design, improved safety by a temperature detection, and less energy consumption.

In order to attain the foregoing objects, an optical coupling device of the present invention includes:

a light emitter provided on an input lead frame;

a photoreceptor provided on an output lead frame;

a load driving semiconductor element provided on a front surface of the output lead frame, and connected to the photoreceptor via the output lead frame; and a sealing resin section as a package for protecting the light emitter, the photoreceptor and the load driving semiconductor element, wherein a thermoelectric conversion element is provided in the package.

In comparison with an optical coupling device having an external thermoelectric conversion element, the optical coupling device of the present invention including the thermoelectric conversion element in the package makes it more possible to simplify the thermal design by temperature control in the package, and to improve the safety by a temperature detection function. Further, it provides a greater effect for saving power generation energy, as the saving can directly be realized at the heat source. Namely, it is possible to provide an optical coupling device which can realize compulsive cooling, temperature detection, and effective use of energy in its package, and has a simpler arrangement for the conventionally-used thermal design, improved safety by a temperature detection, and less energy consumption.

Additional objects, features, and strengths of the present invention will be made clear by the description below. Further, the advantages of the present invention will be evident from the following explanation in reference to the drawings.

DETAILED DESCRIPTION OF THE INVENTION

The following will explain an optical coupling device according to one embodiment of the present invention.

The optical coupling device is, for example, a solid state relay having a thermoelectric conversion element included in its package.

Note that, the thermoelectric conversion element here is a combination of two kinds of metal or semiconductor. This thermoelectric conversion element refers to the one having the Seebeck effect which generates electromotive force by bringing a matter in high temperature into contact with one surface and bringing a matter in low temperature into contact with another surface, and also has the Peltier effect which causes endothermy on one surface and causes radiation on another surface by applying external voltage.

By including the thermoelectric conversion element in the package of the optical coupling device, it becomes more possible to simplify the thermal design by temperature control in the package, and to improve the safety by a temperature detection function. Further, it provides a greater effect for saving power generation energy, as the saving can directly be realized at the heat source. Further, it provides more remarkable effects of the Seebeck effect and the Peltier effect because of the great temperature difference between one surface and another surface, as one surface of the thermoelectric conversion element is placed in the vicinity of the load driving semiconductor element where the temperature becomes the highest, and another surface is placed in an area having a temperature closer to the ambient temperature of the optical coupling device.

Further, it is possible to reduce the number of component when the optical coupling device is mounted to an electronic circuit substrate or the like.

EXAMPLE 1

The following will explain an optical coupling device according to Example 1 of the present invention with reference to a drawing.

Figure 1:
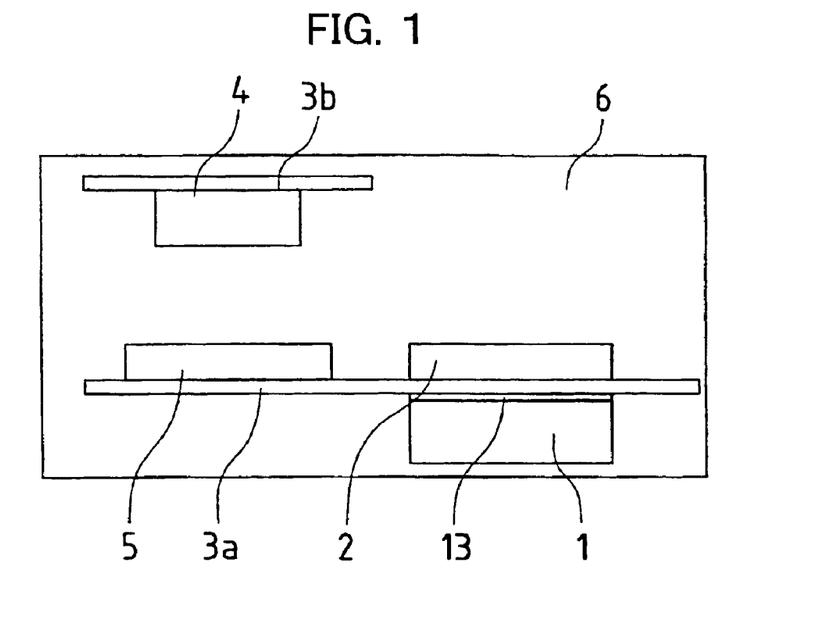
FIG. 1 is an explanatory view showing an optical coupling device according to Example 1 of the present invention.

FIG. 1 is an explanatory view showing an optical coupling device according to Example 1 of the present invention.

The optical coupling device has an arrangement such that a thermoelectric conversion element 1 is provided on the rear surface (lower surface in FIG. 1) of an output lead frame 3a, which is opposite to a surface having a load driving semiconductor element (for example, a triac) 2.

The optical coupling device is equipped with the output lead frame 3a and an input lead frame 3b, which are opposed. The output lead frame 3a has a photoreceptor 5 and the load driving semiconductor element 2 on the surface opposing the input lead frame 3b. Further, the thermoelectric conversion element 1 is provided on the other surface of the output lead frame 3a. The thermoelectric conversion element 1 is provided opposite to the load driving semiconductor element 2 having the output lead frame 3a therebetween. Further, the input lead frame 3b has a light emitter 4 on the surface opposing the output lead frame 3a. That is, the light emitter 4 and the photoreceptor 5 are opposed. Also, the light emitter 4, the photoreceptor 5, the load driving semiconductor element 2, and the thermoelectric conversion element 1 are coated and protected by a sealing resin section 6.

In another way, the optical coupling device is made of the light emitter 4 provided on the front surface (lower surface in FIG. 1) of the input lead frame 3b, the photoreceptor 5 provided on the front surface (upper surface in FIG. 1) of the output lead frame 3a and opposing the light emitter 4, the load driving semiconductor element 2 provided on the front surface of the output lead frame 3a and connected to the photoreceptor 5 via the output lead frame 3a, the thermoelectric conversion element 1 provided on the rear surface of the output lead frame 3a by being provided opposite to the load driving semiconductor element and having the output lead frame 3a therebetween, and the sealing resin section 6 which coats and protects the light emitter 4, the photoreceptor 5, the load driving semiconductor element 2, and the thermoelectric conversion element 1.

With this arrangement, power generation at the thermoelectric conversion element 1 can effectively be carried out by providing the thermoelectric conversion element 1 opposite to the load driving semiconductor element 2 while having the output lead frame 3a therebetween. This is because the load driving semiconductor element 2 has the largest quantity of current flow and therefore temperature becomes high, compared to the rest of members (the light emitter 4, and the photoreceptor 5).

Note that, when current flows between the output lead frame 3a and the thermoelectric conversion element 1, insulation paste 13 may be applied at the set up of the thermoelectric conversion element 1 on the surface of the output lead frame 3a.

EXAMPLE 2

The following will explain an optical coupling device according to Example 2 of the present invention with reference to a drawing.

Figure 2:
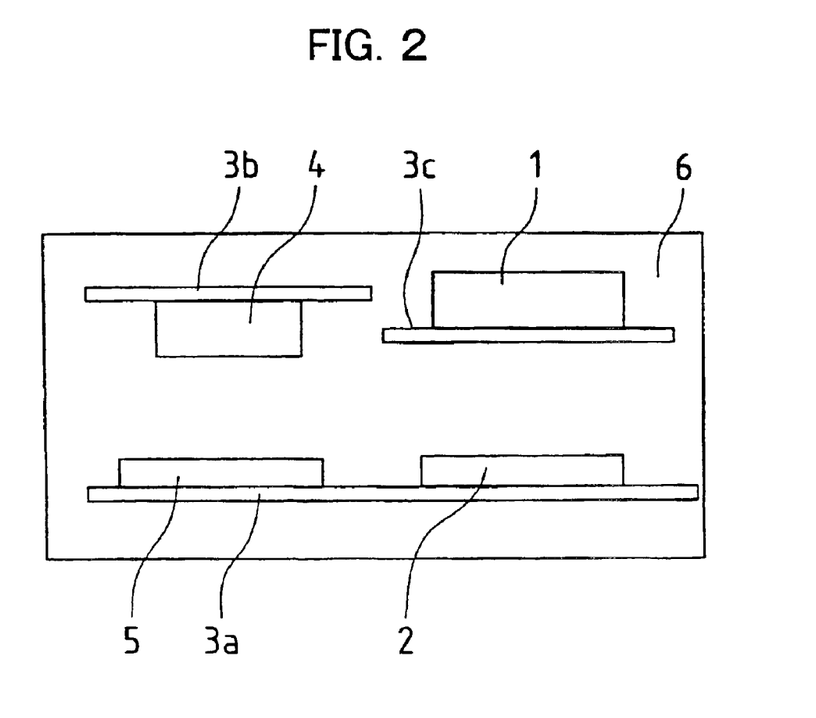
FIG. 2 is an explanatory view showing an optical coupling device according to Example 2 of the present invention.

FIG. 2 is an explanatory view showing an optical coupling device according to Example 2 of the present invention.

This optical coupling device has substantially the same arrangement as that of Example 1 except for the thermoelectric conversion element 1, which is provided on a thermoelectric conversion element lead frame 3c electrically insulated from the output lead frame 3a having the load driving semiconductor element 2. The thermoelectric conversion element 1 is provided on the upper surface of the thermoelectric conversion element lead frame 3c by being opposite to the load driving semiconductor element 2.

Namely, the thermoelectric conversion element lead frame 3c is provided opposing the output lead frame 3a. The thermoelectric conversion element 1 is provided on the surface of the thermoelectric conversion element lead frame 3c not opposing the output lead frame 3a, by opposing the load driving semiconductor element 2.

As described, power generation at the thermoelectric conversion element 1 can effectively be carried out by providing the thermoelectric conversion element 1 opposite to the load driving semiconductor element 2. This is because the load driving semiconductor element 2 has the largest quantity of current flow and therefore temperature becomes high, compared to the rest of members (the light emitter 4, and the photoreceptor 5).

Further, since the thermoelectric conversion element 1 is provided on an alternative lead frame separated to the output lead frame 3a, electrical insulation between the thermoelectric conversion element 1 and the load driving semiconductor element 2 can easily be ensured.

EXAMPLE 3

The following will explain an optical coupling device according to Example 3 of the present invention with reference to a drawing.

Figure 3:
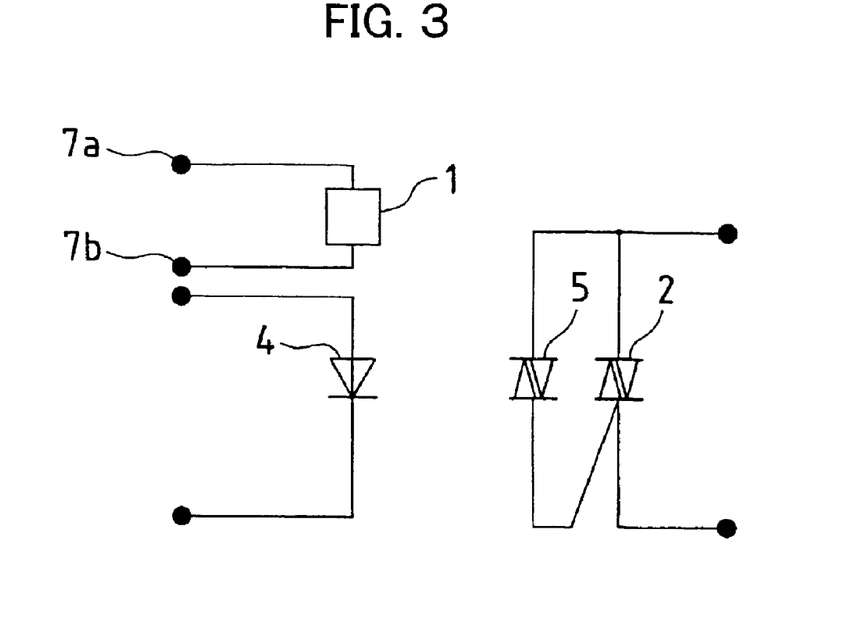
FIG. 3 is an explanatory view showing an optical coupling device according to Example 3 of the present invention.

FIG. 3 is an explanatory view showing an optical coupling device according to Example 3 of the present invention.

In this optical coupling device, voltage applying means (an input terminal 7a connected to an input section of the thermoelectric conversion element 1, and an output terminal 7b connected to an output section of the thermoelectric conversion element 1) is provided in addition to the arrangement of Example 1 or Example 2 so as to compulsively drop the temperature in the package by using the Peltier effect.

For example, as shown in FIG. 3, by providing the input terminal 7a and the output terminal 7b connected to the thermoelectric conversion element 1 in the package of the optical coupling device, it is possible to compulsively apply voltage to the thermoelectric conversion element 1. The application of voltage cools one surface of the thermoelectric conversion element 1, and radiation occurs on the other surface. This surface, where radiation occurs, is externally placed so as to carry out compulsive heat dissipation.

EXAMPLE 4

The following will explain an optical coupling device according to Example 4 of the present invention with reference to a drawing.

Figure 4:
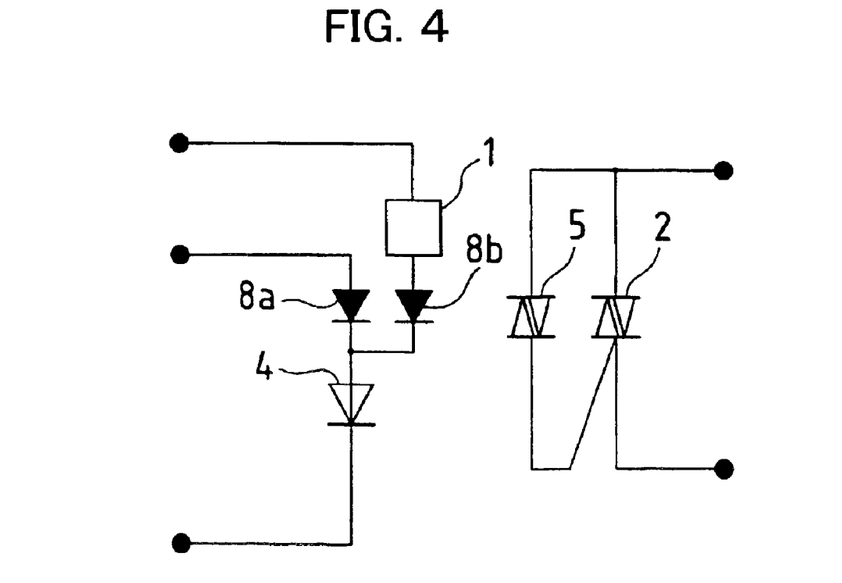
FIG. 4 is an explanatory view showing an optical coupling device according to Example 4 of the present invention.

FIG. 4 is an explanatory view showing an optical coupling device according to Example 4 of the present invention.

In this optical coupling device, the first rectifying diode 8a and the second rectifying diode 8b are provided as means for converting heat from the load driving semiconductor element 2 into voltage at the thermoelectric conversion element 1 by using the Seebeck effect so as to use the voltage as an input current to the light emitter 4 in addition to the arrangement of Example 1 or Example 2.

For example, in this optical coupling, the rectifying diode 8a is connected to an input section of the light emitter 4 by a wire, and an output section of the thermoelectric conversion element 1 is connected to the wire via the second rectifying diode 8b.

Figure 5:
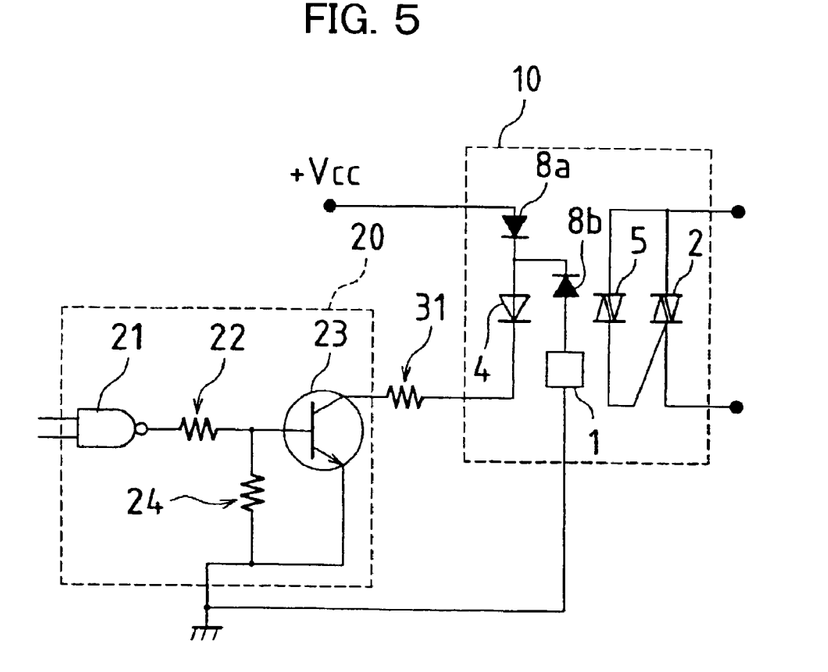
FIG. 5 is a circuit diagram showing an example of the connection state of the optical coupling device shown in FIG. 4 to an external circuit.

Next, the following will explain an example of an optical coupling device having the foregoing arrangement, which is used as a solid state relay 10 provided with an input current driving circuit 20 (external circuit) connected thereto, with reference to a drawing.

FIG. 5 is a circuit diagram showing the optical coupling device of FIG. 4 in a state of being connected to the external circuit.

The input current driving circuit 20 (external circuit) is made of a CMOS IC (Complementary Metal-Oxide Semiconductor: a semiconductor integrated circuit constituted of N-channel Metal-Oxide Semiconductor (NMOS) and P-channel Metal-Oxide Semiconductor (PMOS)) 21, an input driver transistor 23, a first resistor 22, and a second resistor 24.

In the input current driving circuit 20, the base of the input driver transistor 23 is connected to the CMOS IC 21 via the first resistor 22, and the emitter is grounded. Further, the base of the input driver transistor 23 is connected to the second resistor 24, which is grounded.

Accordingly, in another way, the input current driving circuit 20 is made of a CMOS IC (Complementary Metal-Oxide Semiconductor: a semiconductor integrated circuit constituted of N-channel Metal-Oxide Semiconductor (NMOS) and P-channel Metal-Oxide Semiconductor (PMOS)) 21, an input driver transistor 23 whose base is connected to the CMOS IC 21 via a first resistor 22 while its emitter is grounded, and a second resistor 24 whose one end is connected to the base of the input driver transistor 23 while the other end is grounded.

Further, the solid state relay 10 (optical coupling device) is connected to the input current driving circuit 20 via a limiting resistor 31. Namely, one end of the limiting resistor 31 is connected to the collector of the input driver transistor 23 while its other end is connected to the output section of the light emitter 4.

Further, in the solid state relay 10, a voltage+Vcc is applied to the input section of the first rectifying diode 8a, and the output section of the thermoelectric conversion element 1 is grounded.

In the foregoing arrangement where the solid state relay 10 and the input current driving circuit 20 are joined together, firstly, the voltage +Vcc is applied for driving the solid state relay 10 so as to drive the light emitter 4, then as a result of this operation, a current flows in the load driving semiconductor element 2 (a triac in this case). By the current flow in the load driving semiconductor element 2, heat is generated and the temperature in the package of the solid state relay 10 is raised. Here, in the thermoelectric conversion element 1, power generation is carried out with the generated heat above by using the Seebeck effect. Then, when the power generation potential in the thermoelectric conversion element 1 becomes greater than the voltage +Vcc, the current is supplied from the thermoelectric conversion element 1 to the light emitter 4 by controlling the direction of the current with the first rectifying diode 8a and the second rectifying diode 8b. In this manner, energy consumption due to the generated heat can be used as a current, thus realizing power saving.

EXAMPLE 5

The following will explain an optical coupling device according to Example 5 of the present invention with reference to a drawing.

Figure 6:
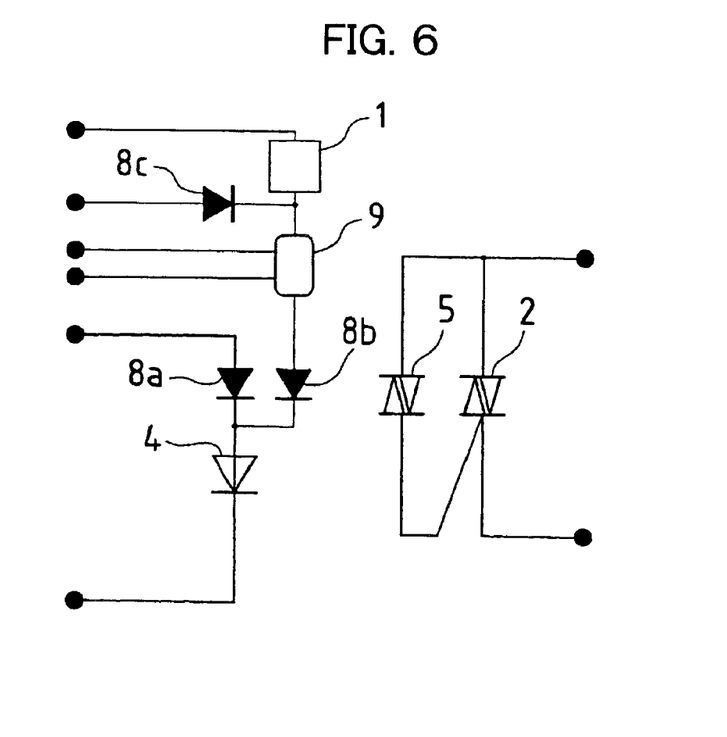
FIG. 6 is an explanatory view showing an optical coupling device according to Example 5 of the present invention.

FIG. 6 is an explanatory view showing an optical coupling device according to Example 5 of the present invention.

In this optical coupling device, switching means (switching element 9) for selecting and switching between an operation of extracting voltage from the thermoelectric conversion element 1 and an operation of applying voltage to the thermoelectric conversion element 1 is provided in addition to the arrangement of Example 1 or Example 2

For example, as shown in FIG. 6, the optical coupling device has an arrangement such that the switching element 9 is serially connected between the thermoelectric conversion element 1 and the second rectifying diode 8b, and one end (cathode) of the third rectifying diode 8c is connected to the wire connecting the thermoelectric conversion element 1 and the switching element 9.

The switching element 9 is a normally-ON switching element, and in a general driving, power generation is carried out in the thermoelectric conversion element 1 with the heat generated in the load driving semiconductor element 2 by using the Seebeck effect so that a current is supplied to the light emitter 4. Then, the switching element 9 is turned off when the temperature in the package is abnormally raised so that a voltage is applied to the thermoelectric conversion element 1 so as to carry out compulsive cooling in the package by using the Peltier effect.

With this arrangement, it is possible to switch between the power generation function and the cooling function of the thermoelectric conversion element 1 as circumstances demand.

EXAMPLE 6

The following will explain an optical coupling device according to Example 6 of the present invention with reference to a drawing.

Figure 7:
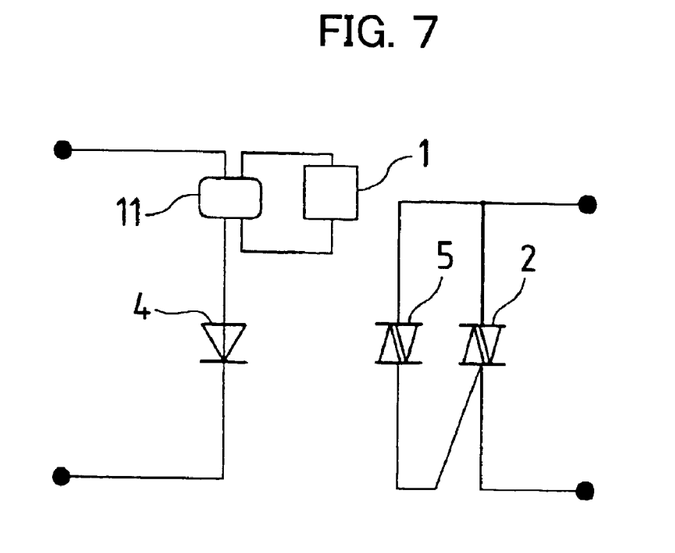
FIG. 7 is an explanatory view showing an optical coupling device according to Example 6 of the present invention.
Figure 8:
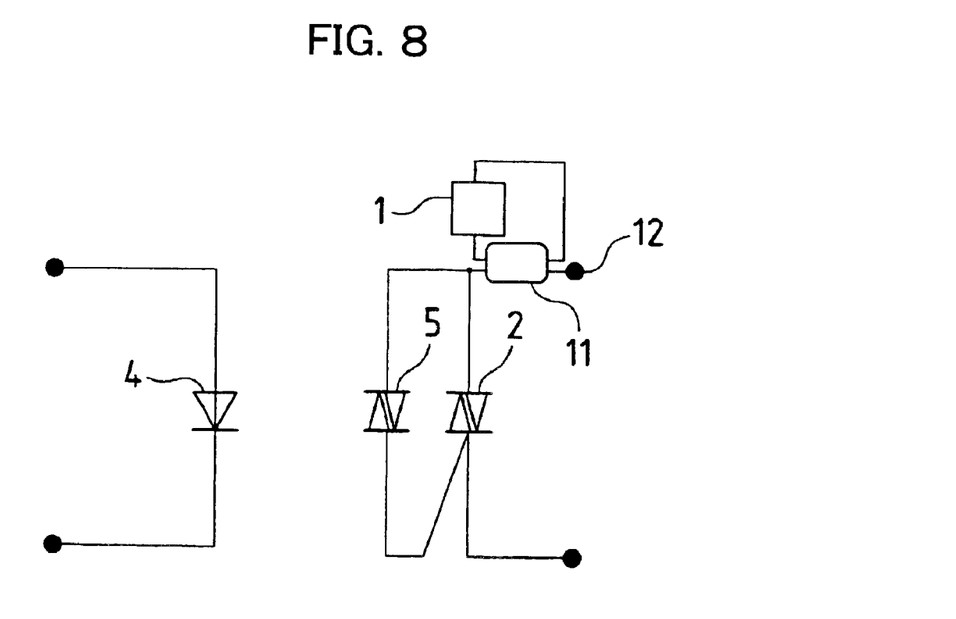
FIG. 8 is an explanatory view showing another optical coupling device according to Example 6 of the present invention.

FIG. 7 and FIG. 8 are explanatory views respectively showing an optical coupling device according to Example 6 of the present invention.

In this optical coupling device, cutoff means (a potential difference detecting and current cutting off circuit 11) is provided in addition to the arrangement of Example 1 or Example 2. The potential difference detecting and current cutting off circuit 11 detects the temperature in the package by measuring electromotive force obtained through conversion of heat from the load driving semiconductor element 2 into voltage at the thermoelectric conversion element 1, and cuts off an input current or an output current when the temperature is abnormally raised. More specifically, the potential difference detecting and current cutting off circuit 11 is made of a potential difference detecting circuit for detecting the potential difference so as to detect the temperature in the package, and current cutoff means for cutting off an input voltage or an output voltage when the detected temperature becomes higher than a predetermined temperature. Note that, the condition in "abnormally raised temperature" refers to a circumstance causing abnormal operations (improper operations) of the load driving semiconductor element 2, the light emitter 4 and the photoreceptor 5 due to high temperature.

For example, as shown in FIG. 7, the optical coupling device has an arrangement such that the input section and the output section of the thermoelectric conversion element 1 respectively connected to an input section and output section of the potential difference detecting and current cutting off circuit 11. Further, another input section of the potential difference detecting and current cutting off circuit 11 is connected to the input terminal of the optical coupling device. Further, another output section of the potential difference detecting and current cutting off circuit 11 is connected to the input section of the light emitter 4.

With this arrangement, it is possible to detect the temperature in the package by the potential difference detecting and current cutting off circuit 11, and to cut off the input current to the optical coupling device when the temperature is abnormally raised. Thus, the improper operation in the optical coupling device due to high temperature (overheat) can be prevented.

Further, as shown in FIG. 8, the potential difference detecting and current cutting off circuit 11 in which the thermoelectric conversion element 1 is connected thereto in parallel may be serially provided between the load driving semiconductor element 2 and the output terminal 12 of the optical coupling device. With this arrangement, by cutting off the output current in the case of high temperature (overheat), the improper operation in the optical coupling device can be prevented.

EXAMPLE 7

The following will explain an optical coupling device according to Example 7 of the present invention with reference to a drawing.

Figure 9:
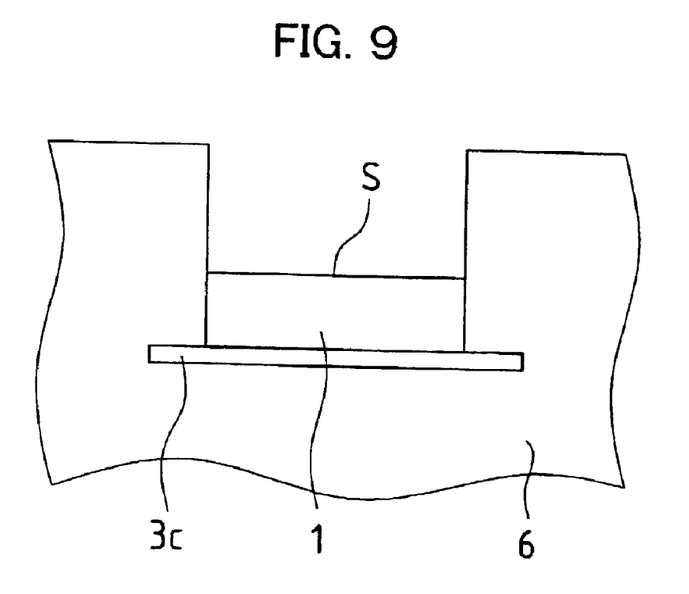
FIG. 9 is an explanatory view showing an optical coupling device according to Example 7 of the present invention.

FIG. 9 is an explanatory view showing an optical coupling device according to Example 7 of the present invention.

This optical coupling device has a function of making temperature difference between the thermoelectric conversion element 1 and other components of the optical coupling device in addition to the arrangement of Example 3 or Example 4. More specifically, the optical coupling device has an arrangement such that the thermoelectric conversion element 1 provided on the thermoelectric conversion element lead frame 3c has a surface S not covered with a sealing resin section. The surface S is opposite to the surface facing the thermoelectric conversion element lead frame 3c.

With this arrangement, the surface S of the thermoelectric conversion element 1 is directly exposed in the ambient temperature, and therefore temperature balance between the surface S and the surface facing the thermoelectric conversion element lead frame 3c can be prevented. Thus, it is possible to improve the cooling effect in the optical coupling device of Example 3, and to improve the power generation efficiency in the optical coupling device of Example 4.

Further, instead of exposing the surface S of the thermoelectric conversion element 1, a very thin sealing resin portion may be provided on the surface S of the thermoelectric conversion element 1. This arrangement provides the same effect as the case where the surface S of the thermoelectric conversion element 1 is exposed. Note that, the very thin sealing portion refers to a portion of the sealing resin section 6 whose thickness is made thinner than the other portions of the sealing resin section 6.

The optical coupling device of the present invention may have an arrangement such that a thermoelectric conversion element is provided on the rear surface of an output lead frame, which is opposite to a surface having a load driving semiconductor element.

With this arrangement, power generation at the thermoelectric conversion element can effectively be carried out by providing the thermoelectric conversion element opposite to the load driving semiconductor element while having the output lead frame 3a therebetween. This is because the load driving semiconductor element has the largest quantity of current flow and therefore temperature becomes high, compared to the rest of members (the light emitter, and the photoreceptor).

Further, the thermoelectric conversion element may be provided on a lead frame electrically insulated from the output lead frame.

With this arrangement, power generation at the thermoelectric conversion element can effectively be carried out by providing the thermoelectric conversion element opposite to the load driving semiconductor element while having the output lead frame 3a therebetween. This is because the load driving semiconductor element has the largest quantity of current flow and therefore temperature becomes high, compared to the rest of members (the light emitter, and the photoreceptor).

Further, voltage applying means may be provided for applying voltage to the thermoelectric conversion element.

With this arrangement, the application of voltage cools one surface of the thermoelectric conversion element 1, and radiation occurs on the other surface. This surface, where radiation occurs, is externally placed so as to carry out compulsive heat dissipation.

Further, leading means may be provided as means for converting heat from the load driving semiconductor element into voltage at the thermoelectric conversion element and for leading the obtained current to the input section of the light emitter so as to use the current as an input current.

In this arrangement, when the power generation potential in the thermoelectric conversion element becomes greater than the applied voltage to the optical coupling device, the current is supplied from the thermoelectric conversion element to the light emitter by the leading means, thus realizing power saving.

Further, switching means may be provided for selecting and switching between an operation of extracting voltage from the thermoelectric conversion element and an operation of applying voltage to the thermoelectric conversion element.

With this arrangement, it is possible to switch between the power generation function and the cooling function of the thermoelectric conversion element as circumstances demand.

Further, cutoff means may be provided for detecting the temperature in the package by measuring electromotive force obtained through conversion of heat from the load driving semiconductor element into voltage at the thermoelectric conversion element, and for cutting off an input current or an output current when the temperature is abnormally raised.

With this arrangement, it is possible to detect the temperature in the package, and to cut off the input current to the optical coupling device when the temperature is abnormally raised. Thus, the improper operation in the optical coupling device can be prevented.

Further, the optical coupling device may have an arrangement such that the thermoelectric conversion element has at least one surface not covered with a sealing resin section, which is not facing the lead frame. Otherwise, a very thin sealing resin portion may be provided on the surface of the thermoelectric conversion element.

This arrangement provides temperature difference between a surface and the other surface of the thermoelectric conversion element.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical coupling device, comprising:
   a light emitter provided on an input lead frame;
   a photoreceptor provided on an output lead frame;
   a load driving semiconductor element provided on a front surface of the output lead frame, and connected to the photoreceptor via the output lead frame; and
   a sealing resin section as a package for protecting the light emitter, the photoreceptor and the load driving semiconductor element,
   wherein,
   a thermoelectric conversion element is provided in the package.

2. The optical coupling device as set forth in claim 1, wherein:
   the thermoelectric conversion element is provided on the output lead frame opposite to the load driving semiconductor element by having the output lead frame therebetween.

3. The optical coupling device as set forth in claim 1, further comprising:
   applying means provided for applying a voltage to the thermoelectric conversion element.

4. The optical coupling device as set forth in claim 1, further comprising:
   leading means provided for leading a current to an input section of the light emitter as an input current, the current being obtained by converting heat from the load driving semiconductor element into a voltage at the thermoelectric conversion element.

5. The optical coupling device as set forth in claim 1, further comprising:
   switching means provided for selecting and switching between an operation of extracting a voltage from the thermoelectric conversion element and an operation of applying a voltage to the thermoelectric conversion element.

6. The optical coupling device as set forth in claim 5, wherein:
   the switching means performs switching operation in accordance with temperature in the package.

7. The optical coupling device as set forth in claim 1, further comprising:
   cutoff means provided for detecting temperature in the package by measuring electromotive force obtained through conversion of heat from the load driving semiconductor element into a voltage at the thermoelectric conversion element, and for cutting off an input current or an output current when the temperature is abnormally raised.

8. The optical coupling device as set forth in claim 2, wherein:
   at least one surface of the thermoelectric conversion element not facing the output lead frame is not covered with the sealing resin section so as to be exposed.

9. The optical coupling device as set forth in claim 2, wherein:
   a portion of the sealing resin section covering at least one surface of the thermoelectric conversion element not facing the output lead frame is thinner than a portion of the sealing resin section covering other surfaces of the thermoelectric conversion element.

10. The optical coupling device as set forth in claim 4, wherein:
    the leading means includes a light emitting diode.

11. An optical coupling device, comprising:
    a light emitter provided on an input lead frame;
    a photoreceptor provided on an output lead frame;
    a load driving semiconductor element provided on a front surface of the output lead frame, and connected to the photoreceptor via the output lead frame;
    a sealing resin section as a package for protecting the light emitter, the photoreceptor and the load driving semiconductor element; and
    a thermoelectric conversion element is provided in the package,
    wherein, the thermoelectric conversion element is provided on a lead frame electrically insulated from the output lead frame.

12. The optical coupling device as set forth in claim 11, wherein:
    the thermoelectric conversion element and the load driving semiconductor element are opposed.

13. The optical coupling device as set forth in claim 11, further comprising:
    applying means provided for applying a voltage to the thermoelectric conversion element.

14. The optical coupling device as set forth in claim 11, further comprising:
    leading means provided for leading a current to an input section of the light emitter as an input current, the current being obtained by converting heat from the load driving semiconductor element into a voltage at the thermoelectric conversion element.

15. The optical coupling device as set forth in claim 11, further comprising:

switching means provided for selecting and switching between an operation of extracting a voltage from the thermoelectric conversion element and an operation of applying a voltage to the thermoelectric conversion element.

16. The optical coupling device as set forth in claim 15, wherein:

the switching means performs switching operation in accordance with temperature in the package.

17. The optical coupling device as set forth in claim 11, further comprising:

cutoff means provided for detecting temperature in the package by measuring electromotive force obtained through conversion of heat from the load driving semiconductor element into a voltage at the thermoelectric conversion element, and for cutting off an input current or an output current when the temperature is abnormally raised.

18. The optical coupling device as set forth in claim 11, wherein:

at least one surface of the thermoelectric conversion element not facing the output lead frame is not covered with the sealing resin section so as to be exposed.

19. The optical coupling device as set forth in claim 11, wherein:

a portion of the sealing resin section covering at least one surface of the thermoelectric conversion element not facing the output lead frame is thinner than a portion of the sealing resin section covering other surfaces of the thermoelectric conversion element.

20. The optical coupling device as set forth in claim 14, wherein:

the leading means includes a light emitting diode.

21. The optical coupling device as set forth in claim 1, wherein:

the thermoelectric conversion element is provided on a first surface of the output lead frame, and the load driving semiconductor element is provided on a partially or completely corresponding portion of a second surface of the output lead frame opposite to the first surface.

* * * * *